United States Patent [19]

Alexander et al.

[11] Patent Number: 4,854,786

[45] Date of Patent: Aug. 8, 1989

[54] COMPUTER CONTROLLED AUTOMATIC SHIFT DRILL

[75] Inventors: Robert H. Alexander, Columbia; Thomas M. Osmer, Lexington; James W. Neely, Columbia, all of S.C.

[73] Assignee: Allen-Bradley Company, Inc., Milwaukee, Wis.

[21] Appl. No.: 199,065

[22] Filed: May 26, 1988

[51] Int. Cl.[4] .................. B23B 47/24; B23B 35/00
[52] U.S. Cl. .................. 408/1 R; 364/474.02; 364/474.17; 364/474.18; 408/6; 408/9; 408/11; 409/187; 409/194
[58] Field of Search .................. 408/1, 3, 6, 9–11, 408/15, 8; 318/432, 433; 364/474.02, 474.17, 474.18; 409/187, 194

[56] References Cited

U.S. PATENT DOCUMENTS

| | | | |
|---|---|---|---|
| 2,901,927 | 9/1959 | Morgan | 77/4 |
| 3,224,338 | 12/1965 | Reynolds | 90/11 |
| 3,248,629 | 4/1966 | Reynolds | 318/257 |
| 3,259,023 | 7/1966 | Rieger et al. | 90/13.5 |
| 3,325,710 | 6/1967 | Reynolds | 318/39 |
| 3,385,136 | 5/1968 | Berry et al. | 74/801 |
| 3,458,881 | 8/1969 | Drechsler et al. | 10/139 |
| 3,526,158 | 9/1970 | Adams et al. | 77/13 |
| 3,596,718 | 8/1971 | Fish et al. | 173/12 |
| 3,710,874 | 1/1973 | Seccombe et al. | 173/12 |
| 3,720,135 | 3/1973 | Merner et al. | 90/14 |
| 3,834,467 | 9/1974 | Fuchs | 173/12 |
| 3,920,082 | 11/1975 | Dudek | 173/12 |
| 4,083,646 | 4/1978 | Vindez | 408/133 |
| 4,157,231 | 6/1979 | Phillips | 408/1 R |
| 4,198,180 | 4/1980 | Schultz | 408/9 |
| 4,279,013 | 7/1981 | Cameron et al. | 364/474.12 X |
| 4,346,444 | 8/1982 | Schneider et al. | 364/475 |
| 4,413,936 | 11/1983 | Kuhlmann | 408/8 |
| 4,451,187 | 5/1984 | Ishikawa et al. | 408/11 X |
| 4,456,960 | 6/1984 | Wakai | 364/474.17 |
| 4,478,538 | 10/1984 | Kakino | 408/6 |
| 4,487,270 | 12/1984 | Huber | 173/12 |
| 4,540,318 | 9/1985 | Hornung et al. | 408/9 |
| 4,648,756 | 3/1987 | Alexander et al. | 408/9 |
| 4,688,708 | 8/1987 | Eckman | 408/9 |
| 4,702,650 | 10/1987 | Golwas et al. | 408/6 |
| 4,713,770 | 12/1987 | Hayes et al. | 364/474.17 |
| 4,745,557 | 5/1988 | Pekar et al. | 408/9 X |

FOREIGN PATENT DOCUMENTS

| | | |
|---|---|---|
| 561361 | 10/1932 | Fed. Rep. of Germany . |
| 2101704 | 8/1972 | Fed. Rep. of Germany . |
| 280300 | 11/1971 | U.S.S.R. . |
| 475253 | 10/1975 | U.S.S.R. .................. 408/9 |

Primary Examiner—Steven C. Bishop
Attorney, Agent, or Firm—Quarles & Brady

[57] ABSTRACT

The trust exerted on a drill bit is sensed and employed to determine the speed at which the bit is driven. A controller for the drill compares the thrust to a predetermined threshold value and in response to the comparison emits a control signal which shifts a transmission in the drill into high or low speed. After each shift, a number of thrust samples are taken in order to compute an average thrust for different strata of the material being drilled. At the completion of drilling each hole, the average thrusts for the hole are used to recalibrate the shift threshold value. In this manner, the shift threshold is adjusted to compensate for drill bit wear. The sensed thrust is also compared to a bit rejected threshold value to determine when the bit is too dull for proper drilling.

20 Claims, 10 Drawing Sheets

DRILL CONTROLLER 26

FIG. 5

DATA STRUCTURE
OF RAM 66

COMPUTER CONTROLLED AUTOMATIC SHIFT DRILL

BACKGROUND OF THE INVENTION

The present invention relates to drills and more particularly to drill controls for automatically changing the speed of a bit in response to the hardness of a material being drilled.

For optimum drilling of a material, the speed of a drill bit must be matched to the hardness of the material. While this is relatively simple when a homogenous material is being worked, regulating the drill speed becomes difficult when the workpiece is a laminated material consisting of layers of material with different hardness. As the drill bit enters each layer of the laminate, its speed may have to be changed according to the relative hardness of the layer.

Industrial drills, such as the one shown in U.S. Pat. No. 4,648,756, provided an automatic feed of the drill bit into the material as it rotated. The operator merely placed a tubular drill nose against the surface of the workpiece and activated the drill. Internal gearing of the drill provided a positive translational feed of the drill bit an incremental distance into the workpiece for each rotation of the bit. The particular drill shown in this Patent also provided a mechanical mechanism for automatically shifting its speed to match the hardness of the particular layer of the laminate being drilled. The speed shifting was based on the depth of the drill into the workpiece as indicated by a cam block machined according to the thickness of the laminate layers and their relative hardnesses. A different cam had to be prepared for each type of laminated material.

Other drills, such as the one shown in U.S. Pat. No. 4,198,180, took advantage of the relationship between the thrust exerted by the drill and the hardness of the material to regulate the speed of the b&t. These types of devices had mechanical mechanisms which tripped at a preset thrust threshold to shift the drill to a higher or lower speed. The thrust threshold at which the drill shifted speeds could not easily be changed when different types of laminated materials were to be drilled. Furthermore, as the drill bit became dull, greater thrust had to be exerted in order for it to drill through each layer of the laminate. The prior mechanically shifted drills did not provide a mechanism for adjusting the shift thrust threshold to compensate for bit wear. In addition, these previous devices did not provide any mechanism for indicating to the operator when excessive bit wear occurred which necessitated changing or sharpening the bit.

SUMMARY OF THE INVENTION

The present invention provides a drill for rotationally driving a bit into a workpiece at one of two speeds in response to a force, such as the thrust, being exerted on the bit. In the preferred embodiment, the thrust is sensed by a yoke which engages the drive mechanism for the bit so that the thrust exerted on the drill bit is transferred to the yoke. Strain gauges on the yoke provide an electrical signal which is representative of the drill bit thrust. A computer controller compares the sensed force to various threshold values which initially have been preset by the operator. Samples of the sensed force are stored for each stratum of the workpiece between the levels where a speed shift occurs. As a result of this comparison, the speed of the drill is shifted, if necessary. Samples of the sensed force are stored for each stratum of the workpiece between the levels where a speed shift occurs. Periodically, for example at the completion of the drilling of each hole, an average thrust is calculated and used to recalibrate the shift threshold to compensate for wear of the drill bit.

A general object of the present invention is to provide a drill which shifts speed automatically according to the hardness of the material being drilled.

A more specific object of the present invention is to provide such a drill which senses a force applied to the drill bit and regulates the speed of the drill according to the relationship of the force to a given threshold level.

Another object is to provide an automatic shifting drill which dynamically varies the shift threshold level to compensate for increased force due to bit wear.

Yet another object of the present invention is to provide an automatic drill which will warn the operator when the bit is becoming excessively dull.

A further object is to provide an automatic drill which senses when the bit enters and penetrates the workpiece. This sensing is employed not only to provide an indication of these events to the operator, but also to govern the drill operation.

The present invention also has the object of providing data regarding the drilling of holes which can be employed to evaluate the manufacturing process and the workpiece.

BRIEF DESCRIPTION OF THE DRAWINGS

FIGS. 8A-D are a flow chart of the computer program for controlling the operation of the present drill.

DETAILED DESCRIPTION OF THE PRESENT INVENTION

Figure 1:
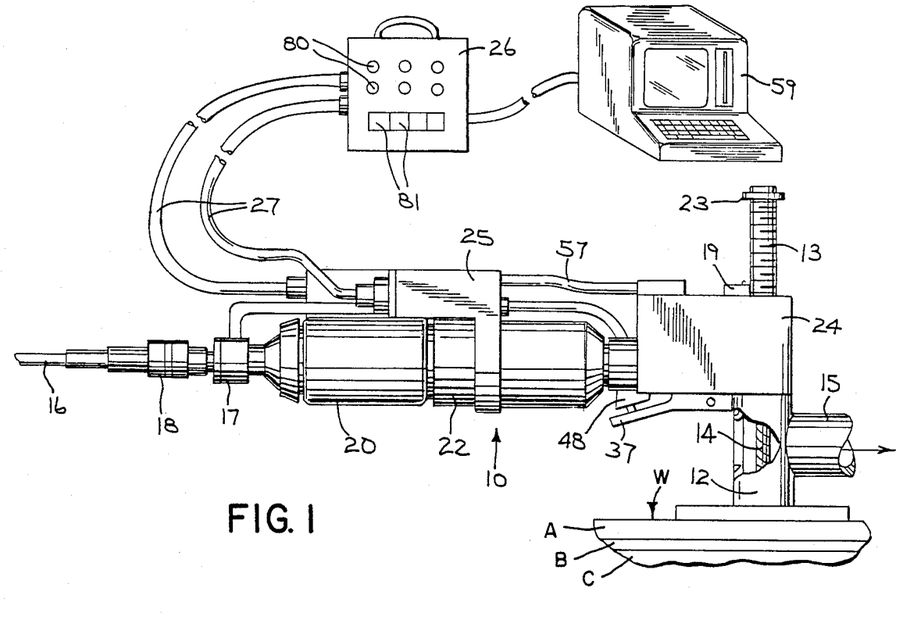
FIG. 1 is a side view of a two-speed automatic shift drill of the present invention positioned against a workpiece.

Referring to FIG. 1, a multispeed drill employing the computerized speed shifting mechanism of the present invention is shown. The drill, generally designated 10, has a mounting nose 12 which is shown abutting a workpiece W made up of layers A, B and C of different hardness materials. The drill 10 rotationally drives and translationally feeds a tool, such as bit 14, into engagement with the workpiece W. A vacuum duct 15 is connected to the nose 12 to remove chips from the area of workpiece W. The drill 10 is pneumatic, being powered by compressed air supplied to the drill 10 by a flexible hose 16 which is connected to an air inlet chamber 17 by coupling 18.

Just forward of the air inlet chamber 17 is a conventional pneumatic motor 20, such as one of the sliding vane type. The motor 20 is the prime mover which converts the compressed air into rotary power to drive the bit 14. The drive is effected via a two speed transmission 22 and a gearbox 24. The drill bit 14 is attached to a spindle 13 of the gearbox which moves vertically to force the bit into contact with the workpiece W. A switch 19 is activated by spindle collar 23 when the spindle 13 reaches the bottom of its travel. The drive mechanism of drill 10 is essentially the same as that disclosed in the previously referred to U.S. Pat. No. 4,648,756 and its teachings are incorporated herein by reference.

The drill 10 also includes a solenoid valve manifold 25 containing two solenoid valves which regulate the air pressure from chamber 17 for shifting the transmission 22 and controlling the feed or retraction of the bit spindle 13, as will be described in detail subsequently. The two solenoid valves respond to control signals sent via cables 27 from a computerized drill controller 26. The cables 27 also carry signals to the controller 26 from torque and thrust sensors within the gearbox 24.

Figure 2:
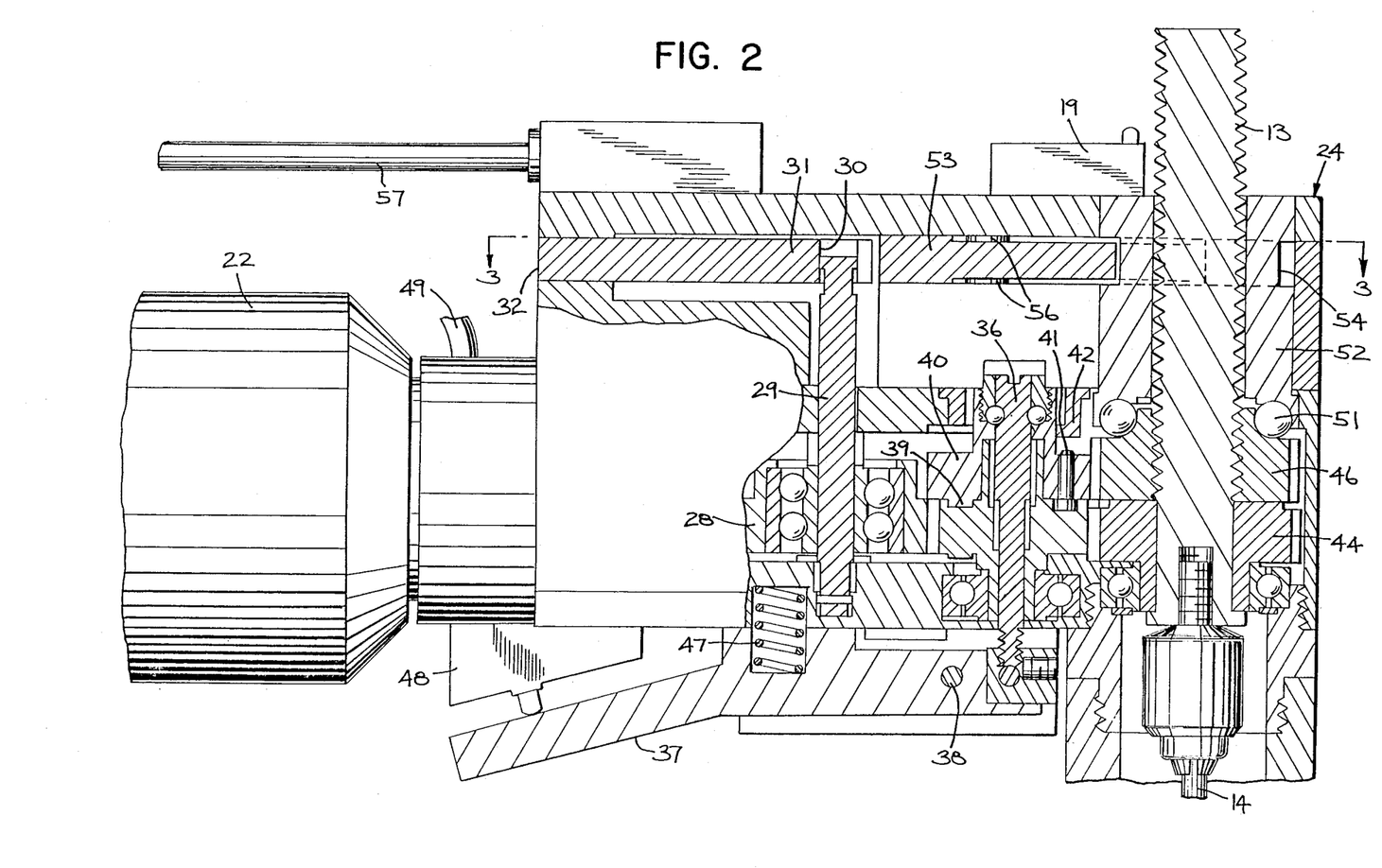
FIG. 2 is a partial cross sectional view of a portion of the drill in FIG. 1 illustrating the drive mechanism.
Figure 3:
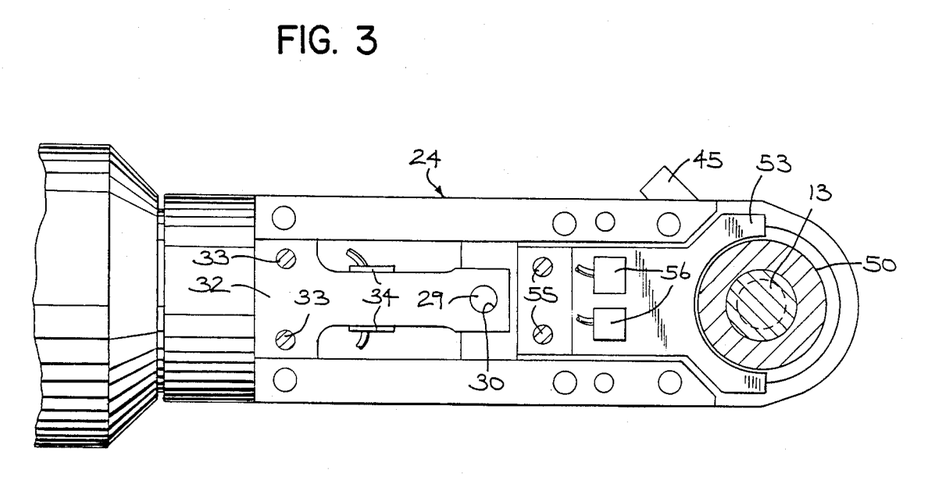
FIG. 3 is a top view of the portion of the drill in FIG. 2 with the upper cover plate removed.

The details of the gearbox 24 and the torque and thrust sensors are shown in FIGS. 2 and 3. The drive shaft of the transmission 22 engages a first spur gear 28 which rotates about a first shaft 29. One end of the first shaft 29 is held within an aperture 30 at one end of a shaft support lever 31. The other end 32 of the shaft support lever 31 is attached to the housing of the gearbox 24 by bolts 33. A separate strain gauge 34 is attached to each side of the shaft support lever 31. As the drill motor 20 applies a driving force to the drill bit 14, the torque applied to the bit is reflected as a lateral force applied by the first shaft 29 to the end of the shaft support lever 31. This force produces a deflection of the support lever 31 in proportion to the applied torque. The deflection of the support lever 31 varies the resistance of the two strain gauges 33 and 34 which are connected together with two fixed resistors (not shown) in a conventional Wheatstone bridge. The strain gauge bridge is coupled by the cables 27 and 57 to the computer controller 26 for the drill 10 (FIG. 1).

The first spur gear 28 drives a second spur gear 35 about a second shaft 36. The second shaft 36 can be moved longitudinally by a operator lever 37 pivoting about pin 38. In the drill bit feed position shown in FIG. 2, lugs 39 of a clutch gear 40 engage similar lugs on the second spur gear 35 so that the clutch gear 40 is driven by the second spur gear 35. In the drill bit retract position (not shown) where the operator lever 37 upwardly shifts the second shaft 36, the lugs 39 are shifted out of engagement with the second spur gear 35, and lugs 41 on the upper surface of the clutch gear 40 engage corresponding lugs on a stationary plate 42 within the gear box 24. The lugs 41 have a beveled edge so that when a given torque is applied to the clutch gear, it will disengage from plate 42 and rotate freely. Intermediate the retract and feed positions, none of the lugs 39 or 41 are engaged so that the clutch gear 40 is free wheeling in a neutral position.

Within continuing reference to FIGS. 2 and 3, a rotary drive gear 44 is coupled to spindle 13 to rotationally drive the spindle but to enable the spindle to slide up and down within the gear 44. The rotary drive gear 44 is driven by the second spur gear 35. A spindle feed gear 46 is internally threaded to mesh with threads on the spindle 13 and can rotate relative to the rotary drive gear 44. The feed gear 46 is driven by the clutch gear 40. The gear ratio between gears 40 and 46 is different from the gear ratio between the gears 35 and 44. Therefore, in the feed position of the clutch gear 40, the feed gear 46 rotates relative to the spindle 13 so that the spindle is advanced downward (the feed gear 46 rotates slightly faster than the spindle 13). In the retract position, the clutch gear 40 is stopped so that the feed gear 46 is also stopped, and the turning of the spindle 13 by the drive gear 44 relative to the feed gear 46 advances the spindle 13 upward very quickly. Therefore, when the second shaft 36 is shifted upwardly, the spindle 13 is retracting and when the second shaft 36 is shifted downwardly, the spindle 13 is feeding the bit 14 toward the workpiece W.

The movement of the second shaft 36 results from the position of the operator lever 37. When the operator pulls the remote end of the lever 37 toward the drill body the second shaft 36 moves downward into the feed position. When the operator releases lever 37, a spring 47 forces the lever into the retract position. In addition, a piston 48 can be activated by air pressure in line 49 from one of the solenoid valves in manifold 25 to force the operator lever 37 to shift the second drive shaft 36 into the retract, upward, position even when the operator is holding the lever in the feed position. This retract solenoid valve is operated by either a signal from drill controller 26 or from the spindle switch 19. When the spindle 13 retracts fully, the torque applied to the clutch gear 40 exceeds the point at which lugs 41 break free of plate 42 and the spindle ceases retracting.

A thrust bearing 51 is retained over the feed gear 46 by a cylindrical bearing race 52. A yoke 53 engages an annular groove 54 around the bearing race 52. The distal end of the yoke 53 is connected to the housing of the gearbox by screws 55. The thrust exerted longitudinally by the spindle 13 and bit 14 against the workpiece W is transferred to the bearing race 54 as a force in the vertical direction of FIG. 2. The thrust transmitted to the bearing race 52 produces a vertical bending of the yoke 53. A separate pair of strain gauges 56 are attached to the upper and lower surfaces of the yoke 53 so that the resistance of each strain gauge varies with the bending of the yoke. The strain gauges 56 are electrically connected in a Wheatstone bridge with the nodes of the bridge being connected by cables 26 and 57 to the drill controller 26 (FIG. 1).

As shown in FIG. 3, a conventional pickup sensor 45 is mounted through the side of the gearbox 24 to detect the rotation of the spindle feed gear 46. The pickup sensor 45 produces an electrical output pulse as each tooth of the feed gear passes its position. The output of the sensor 45 provides an indication of the rotational and translational movement of the spindle 13 and bit 14 to the drill controller 26 via cables 27 and 57. If desired, a second sensor can be provided for the drive gear 44.

Figure 4:
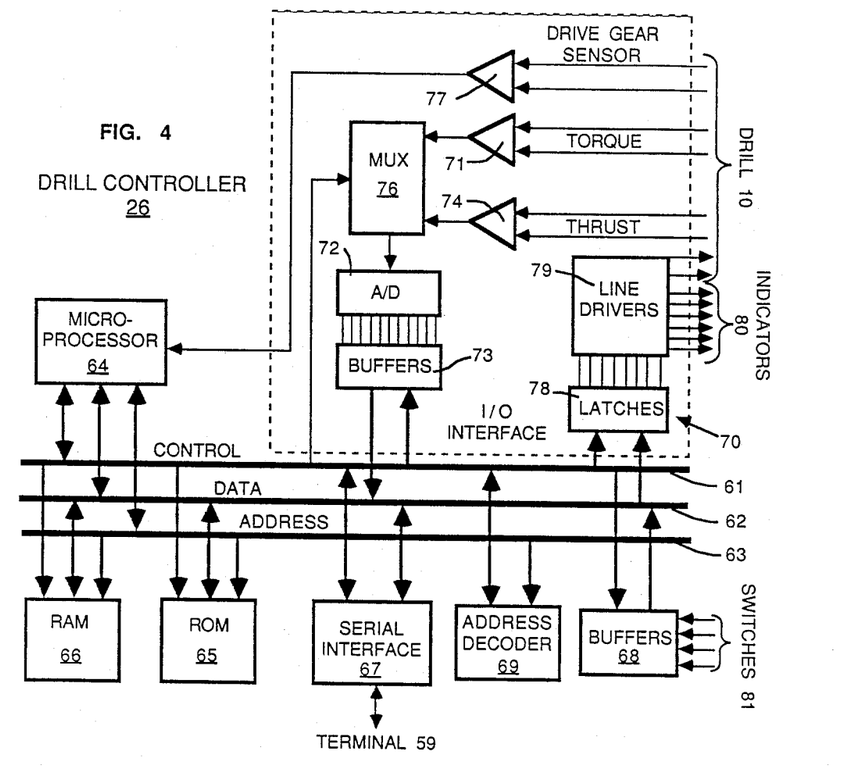
FIG. 4 is a block schematic diagram of the computer controller for the drill in FIG. 1.

The electrical signals from the strain gauges 34 and 56 and sensor 45 are used by the controller 26 to govern the operation of the drill 10. As illustrated in FIG. 4, the components of the drill controller 26 are interconnected by a parallel data bus 62, a parallel address bus 63 and a bus 61 consisting of a set of control lines. A microprocessor 64 is coupled to each of these three buses 61-63 and executes a control program which governs the operation of the drill. The control program for the microprocessor 64 is stored in a read only memory (ROM) 65 while a random access memory (RAM) 66 provides storage locations for data which are used by the microprocessor 64.

Figure 5:
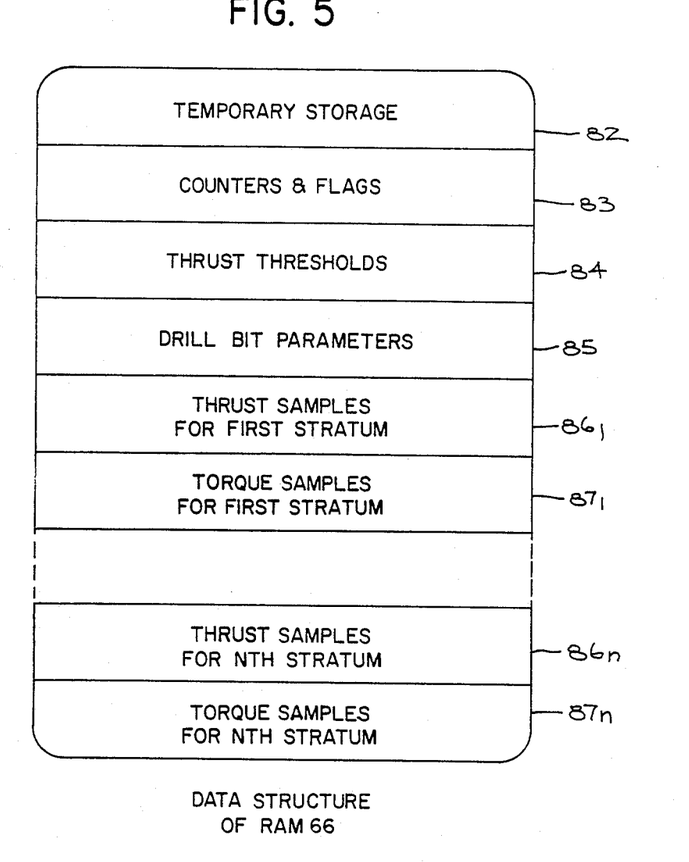
FIG. 5 illustrates the data structure of the random access memory for the controller.

The data structure of RAM 66 is shown in FIG. 5. An initial set of storage locations 82 are set aside as temporary storage for the results of the computations carried out by the microprocessor 64 and for holding I/O data. A group of storage locations 83 are designated for the values of various counters and flags used during the execution of the control program for the drill. As will be described, the drill is controlled by comparing the thrust sensed by the strain gauges 56 to several thresholds. The values of these thresholds are stored in a data table 84 of the RAM 66. In addition, the parameters of the particular drill bit being used are saved in another data table 85. During the drilling of a hole, periodic samples of the thrust and torque for each stratum of the workpiece are saved in sections 86 and 87 respectively of the RAM 66.

Referring again to FIG. 4, a serial interface 67 is connected to the three buses 61-63 to couple the controller 26 to a programming terminal 59, such as a personal computer, shown in FIG. 1. The operation of the drill 10 is initialized by appropriate instructions and function parameters entered via the terminal 59. Once this set up is complete, the terminal 59 can be disconnected from the controller.

The drill 10 is coupled to the controller 26 by an input/output (I/O) interface circuit 70 shown in FIG. 4. The strain gauges 34 on the shaft support lever 31, which provide a signal representing the torque applied to the drill bit 14, are coupled to a first amplifier 71. Similarly, the second set of strain gauges 56, which sense torque, are coupled to a second amplifier 74. The analog outputs of the first and second amplifiers 71 and 74 are connected through a multiplexer 76 to the input of an analog-to-digital (A/D) converter 72. In response to a signal from one of the control lines 61, the multiplexer 76 couples the output of either the first or second amplifier 71 or 74 to the A/D converter 72. The A/D converter produces a ten bit digital representation of the signal from the selected set of strain gauges. The ten bit output from the A/D converter 72 is coupled to the input of a set of data buffers 73 which is connected to a second one of the control lines 61 and to the data bus 62. In response to the enable signal from the second control line 61, the output of the second A/D converter 75 is coupled by the data buffers to the data bus 62. The output pulses from the feed gear sensor 45 are coupled to the input of a third amplifier 77 whose output is connected to a data input of the microprocessor 64.

The I/O interface circuit 70 also includes an multi bit data latch 78, having data input terminals connected to the data bus 62 and an enable input connected to one of the control lines 61. The outputs of the set of data latches 78 are coupled to a set of eight line drivers 79. Two of the output lines from the set of drivers 79 are coupled to the two solenoid valves in manifold 25 to apply air pressure to the shift mechanism in the transmission 22 and to the manual lever piston 48. The remaining output lines from the set of drivers 79 are coupled to indicator lights 80 on the front panel of the controller 26 (see FIG. 1). The functions of the lights 80 will be described subsequently.

The controller circuit depicted in FIG. 4 also includes a set of input data buffers 68 which receive signals from switches 81 on the front panel of the controller 26. The input data buffers 68 are tri-state devices which, when enabled by a signal on one of the control lines 61, couple the switches 81 to the data bus 62. An address decoder 69 is provided which generates enable signals on control lines 61 for the different components of the controller 26 in response to selected addresses on bus 63.

As a preface to a detailed description of the function of the computerized controller 26, an overview of the drill operation will be provided. When the drill 10 is to be employed to bore a hole through a laminated material, the nose of the drill 12 is placed against the workpiece W as illustrated in FIG. 1. The operator then engages the operator lever 37 by drawing it toward the body of the drill into the position illustrated in FIG. 2. In this position the clutch gear 40 engages the lugs of the second spur gear 35 causing the clutch gear to drive the feed gear 46. The driving of the feed gear causes the spindle 13 and bit 14 to advance toward the workpiece W.

As described above, the drill 10 includes sets of strain gauges 34 and 56 which produce electrical signals that represent the thrust and torque forces on the drill bit 14. These signals are periodically sampled and stored in the data tables 86 and 87 in the controller's RAM 66. A number of the samples for each stratum of the workpiece are summed to calculate the average thrust and torque for the strata. As used herein, the term stratum refers to a region of the workpiece between levels at which the drill shifts speed and may comprise one or more layers of the workpiece.

Figure 6:
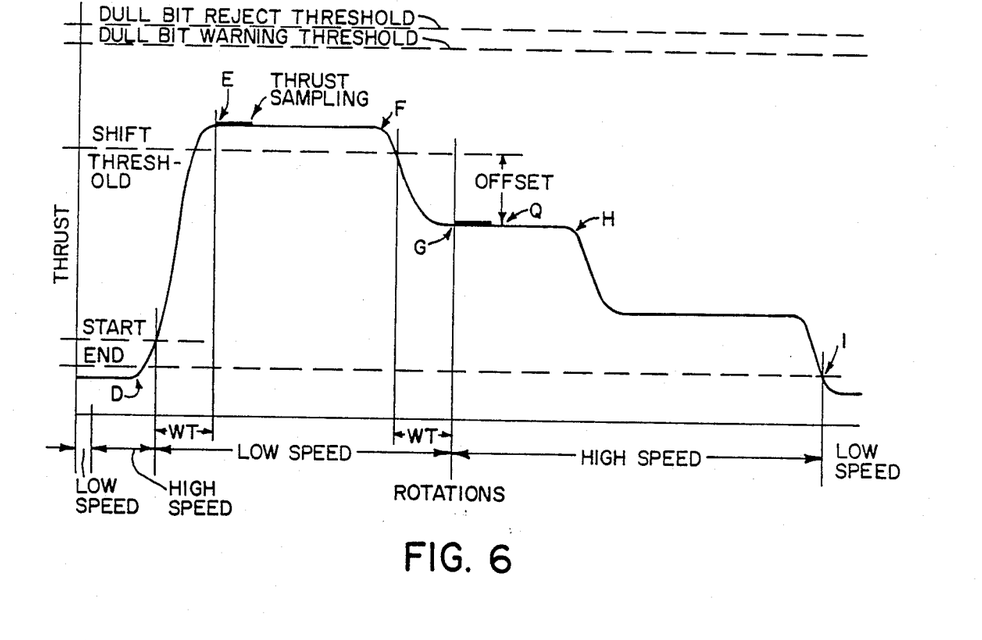
FIGS. 6 and 7 are graphs of the drill bit thrust versus revolutions for the drilling of two different laminated materials.

FIG. 6 is a graph depicting the drill bit thrust versus rotation as the bit penetrates a workpiece in which layer A is relatively hard and layers B and C have decreasing degrees of hardness. Prior to commencing a drilling cycle, the transmission 22 is in low speed as shown on the graph. This low speed is maintained for a short interval following the activation of the manual lever to allow the spindle feed to begin. After this interval, the transmission 22 is shifted into high speed to increase the rate of rotation and feed of the drill bit 14. At this time, the controller 26 begins examining the output signal from the strain gauges 56 on the yoke 53 which sense the thrust being exerted on the drill bit.

Once the drill bit 14 contacts the surface of the workpiece W, as indicated at point D on the thrust curve, the thrust begins to increase. When the thrust exceeds a start threshold value, the transmission 22 shifts to the low speed. Further shifting of the transmission 22 is inhibited during a short interval following a speed shift. The interval is determined by a count of the drill bit rotations. This shift inhibition interval prevents sporadic thrust variations during a speed transition from causing a second shift of the transmission. The thrust continues rising as more surface area on the tapered tip of the drill bit 14 contacts the workpiece. After the expiration of the shift inhibition, interval, the sensed thrust is compared to a shift threshold. Due to the relative hardness of layer A, the sensed thrust is above the shift threshold requiring that transmission 25 be maintained in the low speed mode.

At the expiration of a sampling wait time interval WT (at point E) from the start threshold crossing, a group of thrust samples are summed for later averaging, as indicated by the thicker portion of the curve. This second time delay, provided by the sample wait time interval, allows the drill bit to fully enter the workpiece before the thrust samples are taken. The samples are stored in RAM 66.

At point F on the thrust curve, the drill bit 14 encounters the second layer B of the laminate, which is a relatively soft material as compared to layer A. As illustrated by the graph, the thrust begins decreasing as the drill bit tip enters the second layer B dropping below the shift threshold. However, a shift to high speed does not occur until the expiration of another thrust sampling wait time interval (WT) has expired. This delay prevents the sporadic shifting to high speed when the thrust suddenly decreases due to the drill bit encountering a discontinuities or inhomogeneities in an otherwise relatively hard layer of material. Such a sporadic shift to high speed could damage the bit or the workpiece. If the thrust is still below the shift threshold value at the expiration of the wait time, (e.g. at point G), the transmission 22 will shift into high speed and another group of thrust samples will be summed as indicated by the heavier portion of the curve.

When the drill bit 14 encounters the third layer C of material at point H on the curve, because that layer is softer than the second layer, the thrust will still be below the shift threshold and the transmission will continue in the high speed mode. Since a shift in speed did not occur at the entry into layer C, thrust samples are not taken and layers B and C are considered as a single speed stratum. Separate sets of thrust samples are taken and stored in RAM 66 for each stratum.

When the drill bit breaks through the lower surface of the workpiece W, the thrust will drop below an end threshold value at point I. The transmission 22 is shifted to the low speed at this point to reduce burring of the workpiece. The operator then releases the manual operator lever 37 disengaging the clutch gear 40 from the second spur gear 35 causing a retraction of the spindle 13 and the drill bit 14.

If at any time, the sensed thrust exceeds a dull bit warning threshold, a signal is sent to the operator via one of the indicator lamps 80 on the controller 26. Exceeding this thrust threshold value indicates that the drill bit 14 is beginning to wear excessively. Thereafter, should the sensed thrust exceed a higher threshold value, designated as the bit reject threshold, the drill bit 14 is automatically retracted from the workpiece and another indication via a lamp 80 is provided to the operator. Further operation of the drill 10 is inhibited by the controller 26 until the operator indicates by activating one of the controller switches 81 that the drill bit has been replaced with a sharper one. Alternatively the operation can be restored by downloading a new set of parameters from terminal 59.

Figure 7:
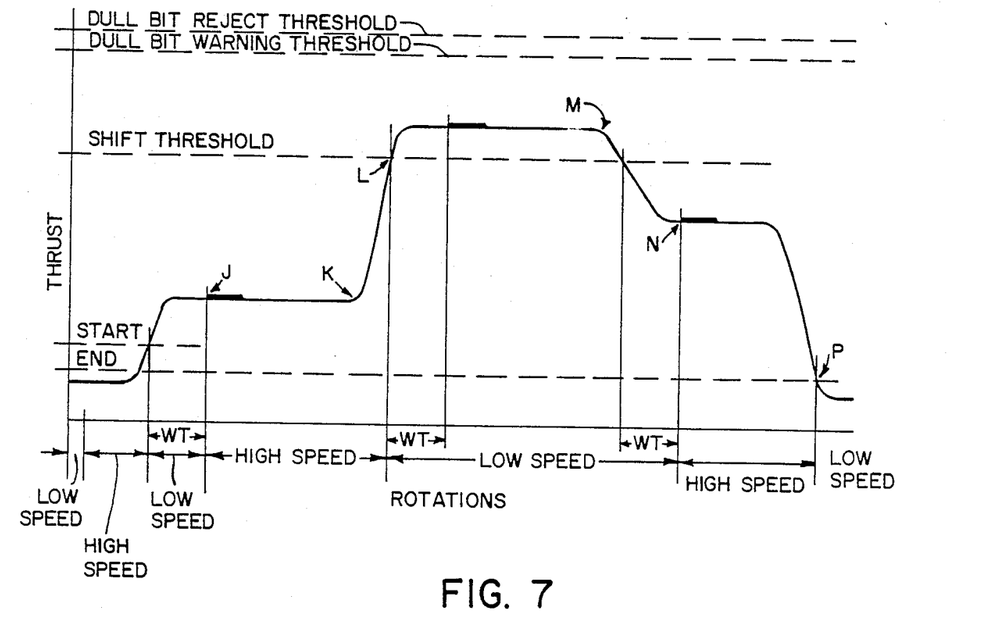

FIG. 7 illustrates a curve of the thrust encountered when the drill is used in a different laminated workpiece W where the middle layer B is significantly harder than the layers A and C on either side of it. In this example after the end of the wait interval from the crossing of the start threshold (point J), the sensed thrust is below the shift threshold and the transmission 22 shifts into high speed. When the second layer B is encountered at point K, the thrust quickly rises exceeding the thrust threshold at point L. As little damage to the drill bit or the workpiece can occur from a sporadic shift to low speed, the thrust rising above the shift threshold immediately produces a shift to low speed, rather than delaying the shift until the expiration of the wait time interval (WT). However, the accumulation of the thrust samples for averaging is still delayed for interval WT to insure that the bit has fully entered the next layer of material.

At point M on the thrust curve, the drill bit 14 has encountered the third layer C of the workpiece, which is softer that the second layer B. As a result, the thrust decreases, falling below the shift threshold level and triggering another sampling wait time delay. However, the downward crossing of the thrust threshold does not trigger an immediate shift to high speed. Rather, the shift occurs after the expiration of the wait time interval WT at point N, if the thrust is still below the shift threshold value. As with the previous example, once the drill bit exits the bottom surface of the workpiece, the thrust drops below the end threshold value at point P and the transmission shifts into the low speed mode to reduce burring.

With the foregoing overall explanation of the drill's operation in mind, a detailed description of the computer control can be given. The controller 26, shown in FIG. 4, governs the drill's operation according to a control program stored in ROM 65. This program uses two counter values stored in area 83 of RAM 66 which are decremented on each pulse from feed gear sensor 45. These counters act as timers for the thrust sampling delay (WT) and for inhibiting subsequent speed shifting for a period after a shift occurs. The program also uses the following flags, stored in RAM area 63, to indicate different stages of operation:

| Flag | Indication |
| --- | --- |
| New Hole | Drill Started A New Hole |
| Start | Bit Encountered Workpiece |
| Stop | Bit Penetrated Through Workpiece |
| Speed | Drill In Low Or High Speed |
| Shift | Shift Occurred Recently |
| Above | Thrust Above Shift Threshold |

The indication provided by each flag will be explained in the subsequent section on the program's execution.

Prior to drilling a new type of material, the operator enters the thrust values for the start, speed shift, end, drill bit warning and drill bit rejection thresholds via the terminal 59. The specifications of the drill bit, such as its length, diameter, tip angle and tip length, are also entered into the terminal. These specifications enable the actual thrust and torque of the bit to be derived from the strain gauge outputs. The entered data are transferred from the terminal 59 to the controller 26 where they are stored in data tables 84 and 85 of RAM 66. The terminal 59 then can be disconnected from the drill controller.

Figure 8A:
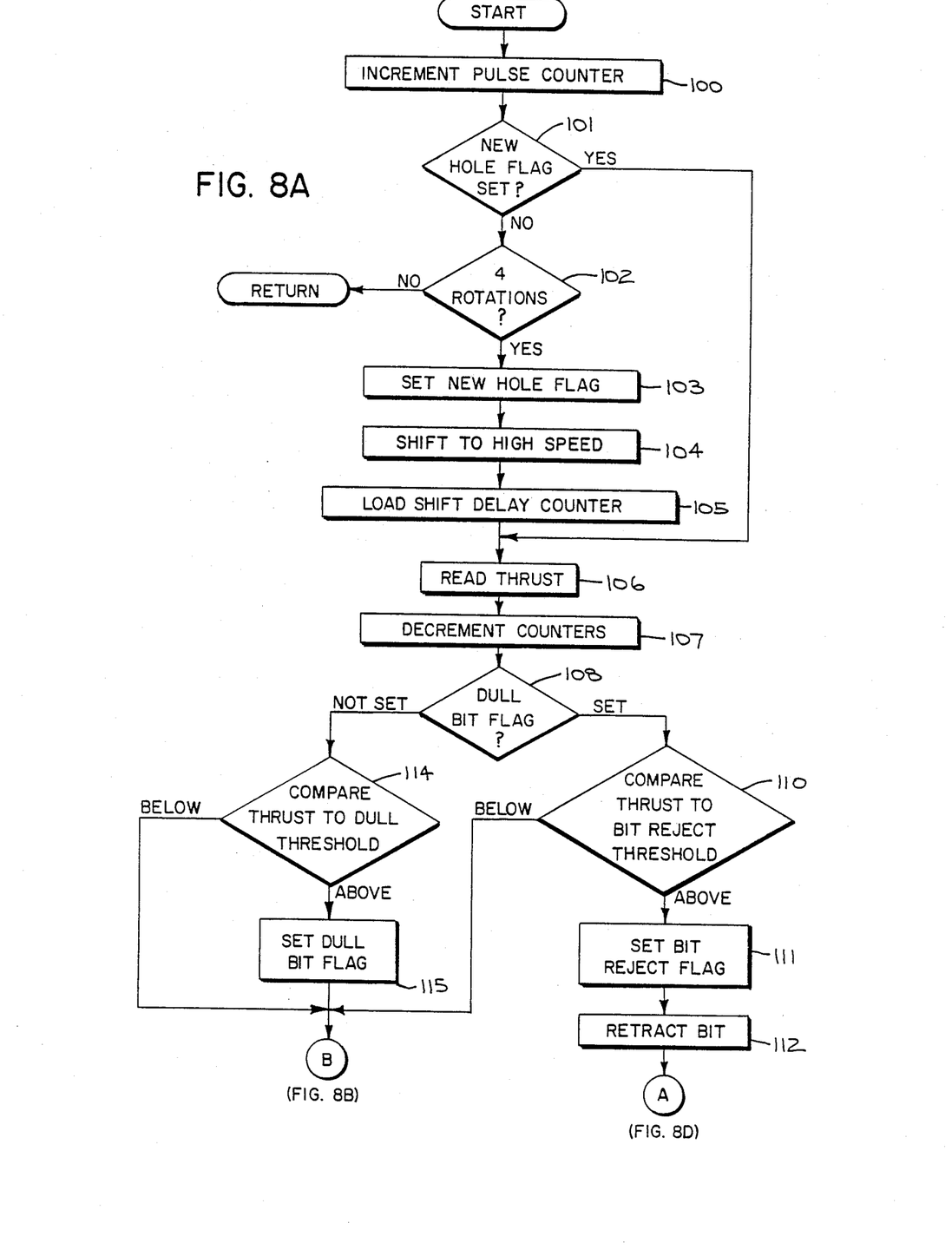

Once these data values have been loaded into the controller 26, the operator can commence using the drill by pressing one of the front panel switches 81 to place the system in the run mode. The air supply to hose 16 is opened and the bit 14 begins rotating. The nose 12 of the drill 10 is positioned over the location on the workpiece at which the hole is to be drilled. Then the manual lever 37 is pulled toward the drill body to engage the clutch gear 40 with the second spur gear 39 causing the spindle 13 to advance the bit 14 toward the workpiece. As the feed gear 46 begins to turn, the pickup sensor 45 starts emitting pulses to the controller 26. A pulse is sent as each tooth of the gear passes the sensor's location and indicates movement of the bit 14. Each sensor pulse signals the controller's microprocessor 64 to execute a pulse service routine depicted by the flowchart of FIGS. 8A-D.

With reference to this flowchart and the controller circuit in FIG. 4, the pulse service routine commences by the microprocessor 66 incrementing a counter address in RAM 66 which tabulates the pulses from the sensor 45 at step 100. This tabulation is used to determine the number of rotations of the drill bit 14. Next, the microprocessor 66 tests a flag at step 101, which indicates whether a new hole is being started. At the start of a new hole, the program advances to step 102 where the value of the sensor pulse counter is examined to determine if four rotations of the bit have occurred since the start of the hole. If not, the pulse service routine execution ends, returning to the main controller program. The main program supervises communication with terminal 59, detects the activation of switches 81, and processes torque and thrust data samples for each hole as will be described. As the drill 10 started in low speed, the four rotation test at step 102 provides the initial period of slow speed operation depicted in FIGS. 5 and 6 enabling the spindle advance to start smoothly.

After four rotations have occurred, the program execution advances to step 103 where the new hole flag is set so that on subsequent passes, the pulse service routine execution will jump from step 101 to step 106. The drill 10 is then placed in high speed by setting one of the data latches 78 which energizes the speed shift solenoid valve in the manifold 25. Another data latch 78 is set to illuminate a lamp 80 to indicate high speed operation. A speed flag in RAM 66 is also reset to indicate high speed operation. This shift to high speed quickly advances the drill bit 14 toward the workpiece W. Then a shift delay counter address in RAM 66 is loaded with a value equal to the number of feed gear sensor pulses which occur in twenty spindle rotations. This counter inhibits another shift from occurring for twenty rotations so that the spindle can reach high speed.

Next, the microprocessor 64 signals the multiplexer 76 to select the output from the second amplifier 74, and then addresses the data buffers 73 to obtain the present value of the signal from the thrust strain gauges 56. As this value represents the amount of deflection of yoke 53, it has to be combined with a gear train scaling factor and the bit diameter to derive the actual thrust on the drill bit 14, which is then stored as the sensed thrust sample in a temporary storage location 82 in RAM 66 at step 106. The program advances to step 107 where the shift delay counter is decremented along with a second counter which provides a delay for the accumulation of thrust and torque samples after a shift in speed has occurred.

Next, at step 108, the microprocessor 64 tests a flag which indicates that the thrust has exceeded the dull bit warning threshold value set by the operator. If this flag has been set previously, a test is conducted at step 110 by the microprocessor 64 comparing the sensed thrust to the higher bit rejection thrust threshold value at step 110 (see also FIG. 6). If the sensed thrust is below the bit rejection threshold level, the program advances to step 116; whereas if it is above this rejection threshold, the program branches to step 111. At step 111, the microprocessor sets a tool reject flag in RAM 66 and also activates an indicator lamp on the front panel of the controller 26 by setting the corresponding data latch 78. Then, at step 112, the microprocessor 64 sets another one of the data latches 78 to activate the retraction solenoid valve within the manifold 25 of the drill. The activation of the retraction solenoid valve applies air pressure to the piston 48 which pivots the operator lever 37 placing the clutch gear 40 in the spindle retract position. This causes the spindle 13 to retract the bit 14 from the workpiece. Once the drill has been placed in the retract mode, the pulse service routine advances to step 150 on FIG. 8D and ultimately returns to the main program in the controller 26.

Assuming that the dull bit flag was not found to be set at step 108, the program execution branches to step 114 where the sensed thrust value is compared to the dull bit warning threshold by microprocessor 64. If the current thrust is below the warning threshold, the program will advance directly to step 116, otherwise the microprocessor 64 will set the dull bit flag at step 115 before advancing.

Figure 8B:
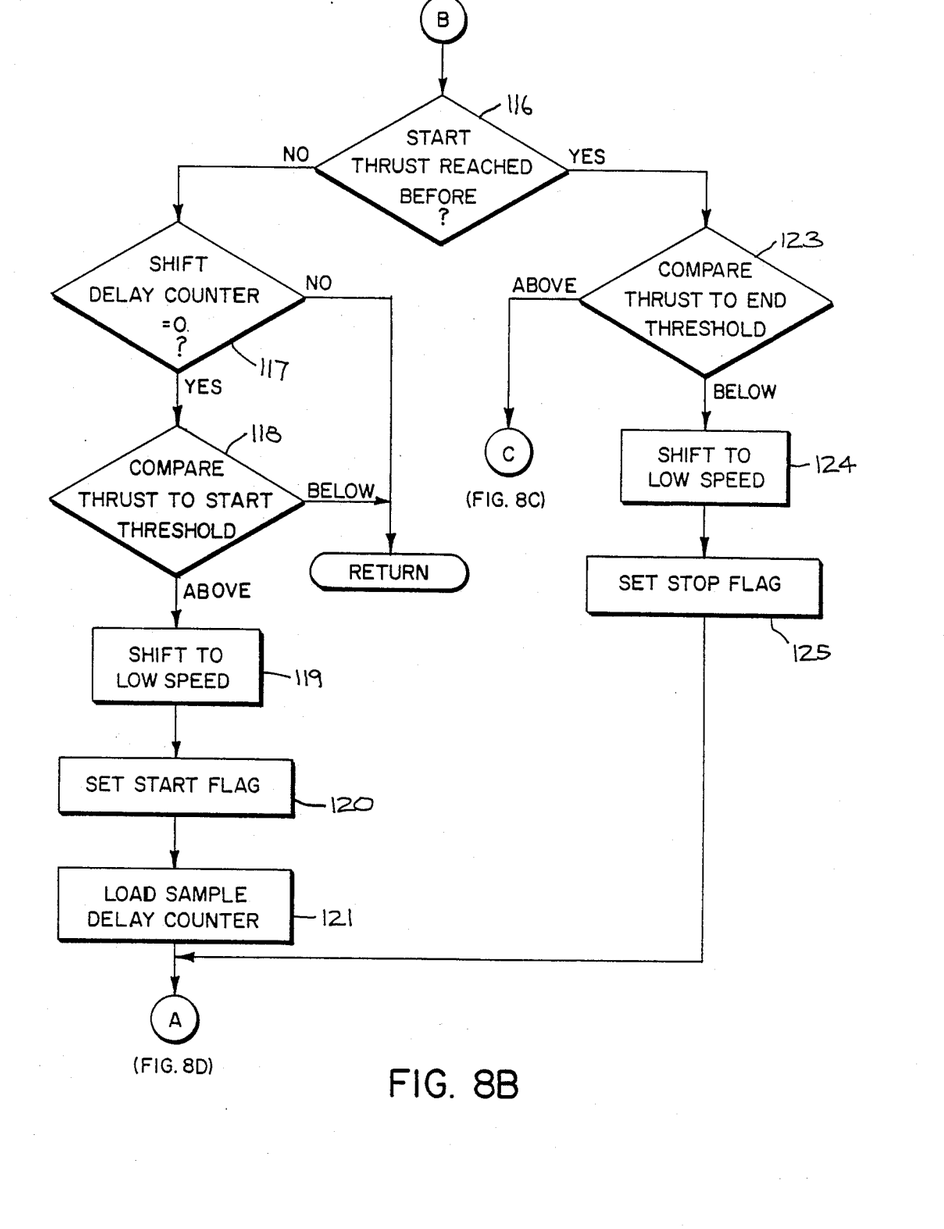

Referring to FIG. 8B and step 116, another flag within RAM 66 is tested to determine if the start threshold has been reached previously. If the start threshold has yet to be reached, the program branches so that the sensed thrust can be compared to the start threshold value. This branch commences at step 117 where the microprocessor 64 examines the shift delay counter to determine whether it has "timed out". If the value of the shift delay counter is at a nonzero value, the program returns to the main control program. Once the shift delay timer has reached zero, the program execution advances on that pass to step 118 where the sensed thrust is compared to the start threshold stored in RAM 66. If the sensed thrust is below the start threshold, the pulse service routine returns to the main control program, otherwise if it is above the threshold, the program execution advances to step 119. At this point, the start threshold has been exceeded and the drill 10 is shifted into low speed so that the bit can enter the material without damage which could occur if high speed was maintained. The shift is effected by the microprocessor 64 resetting the corresponding data latch 78 so that the shift solenoid valve on the drill 10 is deenergized. In addition, another one of the data latches 78 is also reset to turn off the high speed indicator lamp 80 on the front panel of the controller 26. The microprocessor 64 next sets a flag within RAM 66 that indicates that the start threshold has been exceeded at step 120. Thereafter at step 121 in this branch of the program, the sample delay counter in RAM 66 is loaded with a value that is equivalent to the number of drill bit rotations for the shift delay time interval (WT) shown in FIGS. 6 and 7. As will become apparent shortly, this counter delays the summation of thrust samples for averaging until the drill bit 14 has decreased to low speed and has fully entered the workpiece. The program execution then jumps to step 150 on FIG. 8D.

Referring still to FIG. 8B, on the next execution of the pulse service routine, the start indicator flag will be found to be set at step 116 causing the program execution to branch to step 123. At this point, the value of the sensed thrust, obtained previously at step 106, is compared to the end threshold level stored within RAM 66. If this comparison determines that the sensed thrust is below the end threshold, the controller 26 deactivates the shift solenoid valve so that the drill 10 is placed in low speed and the appropriate indication is provided by lamps 80 at step 124. The microprocessor 64 also sets a stop flag within RAM 66 which indicates that the thrust has fallen below the end threshold indicating that the drill operation should be stopped at step 125. The program then advances to step 150.

Figure 8C:
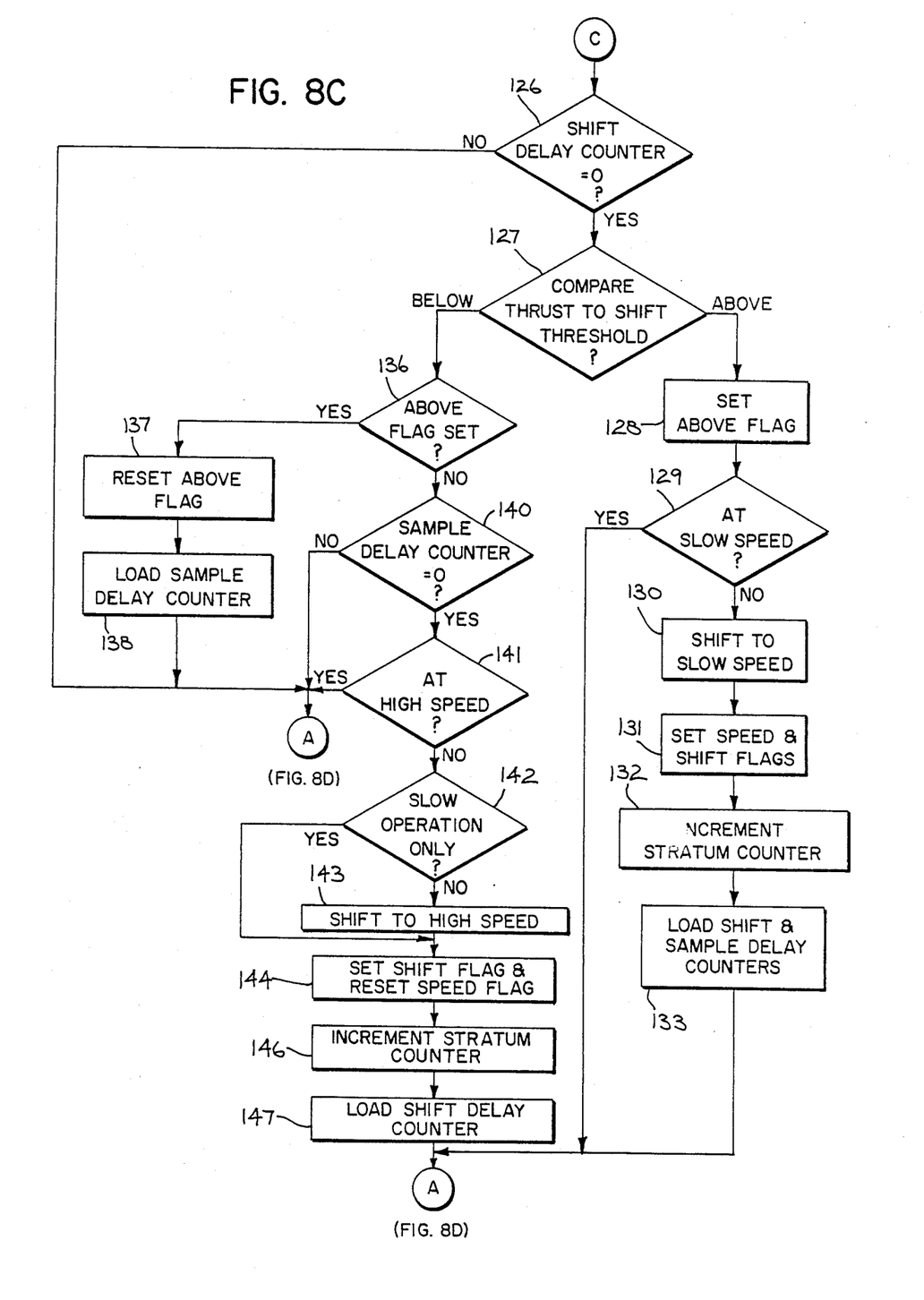

However, if the sensed thrust is above the end threshold value at step 123, the program branches to step 126 on FIG. 8C. At this point, the microprocessor 64 examines the shift delay counter to determine whether a speed shift should be inhibited from occurring during this pass through the pulse service routine. If the shift delay counter has a non-zero value, the program execution jumps to step 150 bypassing a comparison of the sensed thrust to the shift threshold. Otherwise, if speed shifting is not currently inhibited by the shift delay counter, the program advances to step 127 where the sensed thrust is compared to the shift threshold stored in RAM 66. This point in the program will be executed at points E and J on the curves of FIGS. 6 and 7, respectively.

If the present value of the thrust is above the shift threshold as would occur at point E on the curve of FIG. 5, the program execution advances to step 128. At this point, the microprocessor sets a flag within RAM 66 which indicates that the thrust is above the shift threshold. Since a rise in the thrust above the shift threshold indicates that the drill should be shifted into low speed, the microprocessor then examines a speed indicator flag to determine whether the drill transmission is currently in low speed at step 129. If it is already at that speed no further speed control is required, such as at point E on the curve of FIG. 6, and the program then advances directly to node A. If however, an examination of the flag at step 129 indicates that the drill is currently in high speed, as would be the case at point L on the curve of FIG. 7, the controller 26 shifts the drill transmission 22 into low speed at step 130. Once the shift has occurred, the microprocessor 64 sets the low speed indicator flag and the shift occurred flag at step 131. RAM 66 also has a storage location which has been designated to store a count of the number of different speed strata within the workpiece W. The value of this counter is then incremented by the microprocessor 64 at step 132. Thereafter the thrust samples will be stored in a different thrust data table 86 of RAM 66 which holds the samples for that speed stratum. In addition, the shift delay and sample delay counters are loaded with their initial values at step 133 before the program advances to node A.

During the next several consecutive executions of the pulse service routine, the shift delay counter will have a non-zero value so that further testing of the thrust to the shift threshold at step 127 will be bypassed by a jump to node A from step 126. Eventually, when the shift delay counter reaches zero, the microprocessor 64 will again carry out the comparison at step 127. If this comparison indicates that the sensed thrust is below the shift threshold, the program will branch to step 136 where the above flag is tested. If the above flag is set, indicating that a downward crossing of the shift threshold has just occurred, the microprocessor will reset the above flag at step 137 and load the initial value into the sample delay counter at step 138 before advancing to step 150. As illustrated in FIG. 6, when a downward crossing of the shift threshold occurs, such as between points F and G, a shift to high speed is inhibited until the end of the sample delay interval WT.

On the next execution of the pulse service routine, the testing of the above flag at step 136 will indicate that it is not set so that the program will advance to step 140. However, when the microprocessor 64 examines the sample delay counter, it will be found to have a non-zero value at step 140 indicating that the delay interval WT has not expired. The program execution will then branch repeatedly from step 140 to step 150 until the sample delay counter has "timed out". When the sample delay counter has reached zero, the speed flag will be examined at step 141 to determine whether the drill is already at high speed. If so, the program will bypass the high speed shift instructions advancing directly to step 150. If, however, the drill is currently at low speed, such as would be found at point G of FIG. 6, the microprocessor 64 will examine a flag within RAM 66 which indicates that the drill is to be operated only in slow speed. If slow speed only operation is not indicated by this flag, a shift to high speed will occur at step 143. Then at step 144, the shift flag will be set to indicate that the speed has been changed and the speed flag is reset to indicate high speed operation at step 144. The microprocessor then increments the speed stratum counter at step 146 so that the thrust sample will be stored in the next thrust data table 86 in RAM 66. The shift delay counter is again loaded with its initial value at step 147 before advancing to step 150.

Figure 8D:
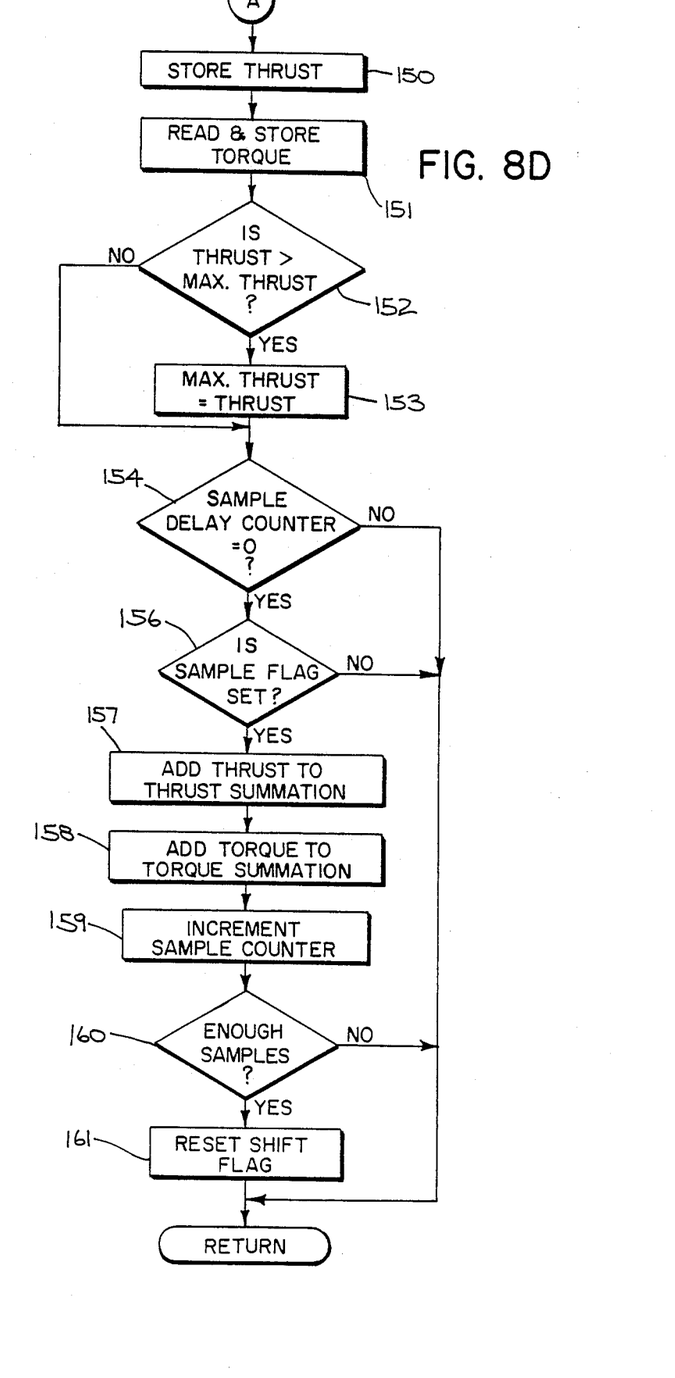

Commencing at step 150 on FIG. 8D, the gear pulse service routine enters a section in which the drill torque and thrust samples for each workpiece stratum are stored for evaluation by the controller 26 at the completion of drilling the hole. In this section of the program, the most recent thrust value is transferred at step 150 into the thrust sample data table 86 for the current speed stratum as indicated by the stratum counter. Next, at step 151, the value of the torque applied to the spindle 13 is obtained by the microprocessor 64. In doing so the multiplexer 76 is directed to couple the first amplifier 71 to the A/D converter 72, and the microprocessor reads data buffers 73 which now contain the digitized output from the torque sensing strain gauges 34. As the strain gauges 34 do not measure the spindle torque directly, the digital input signal from buffer 73 may have to be converted by the microprocessor into the actual torque level which is then stored in the torque data table 87 for the current layer within RAM 66. Once the torque and thrust values have been archived, the program execution proceeds to step 152 where the current thrust value is compared to the previous highest thrust value for the current stratum of the workpiece. If the current thrust is the highest level for the stratum, it is then stored as the stratum's maximum thrust in a location in data table 86 for the current workpiece speed stratum at step 153.

The microprocessor 64 then examines the value of the sample delay counter at step 154 to determine whether a series of thrust samples for this stratum of the workpiece should be recorded. If the sample delay counter has timed out (reached zero), the expiration of the delay interval WT has occurred and the program advances to step 156. Otherwise, the execution of the interrupt routine terminates during the delay interval WT. At step 156, the microprocessor examines the shift flag which indicates not only that a shift has recently occurred, but that additional samples of thrust and torque are to be accumulated for averaging purposes. If the shift flag remains set at step 156, the current value of the thrust is added to previous values for this speed stratum at step 157 and the current torque value is added to the previous torque values at step 158. The torque and thrust values for each speed stratum of the workpiece W are accumulated the corresponding data tables in RAM 66 so that later processing of the data can derive an average thrust and torque for each of the strata. The microprocessor 64 at step 159 increments a storage location within RAM 66 which counts the number of samples which have been accumulated for the current stratum of the workpiece. This count is then compared at step 160 to the desired number of samples to be taken, and if that number has been reached, the shift flag is reset at step 161 so that further accumulations of the thrust and torque samples will not occur on subsequent executions of the pulse service routine. The routine then returns to the main program within the controller 26.

Upon return from the pulse service routine, the main control program instructs the microprocessor 64 to examine the tool reject flag and the operation stop flag within RAM 66. If the dull bit reject flag is found to be set, further operation of the drill 10 is inhibited until the operator indicates that the bit has been replaced.

Figure 9:
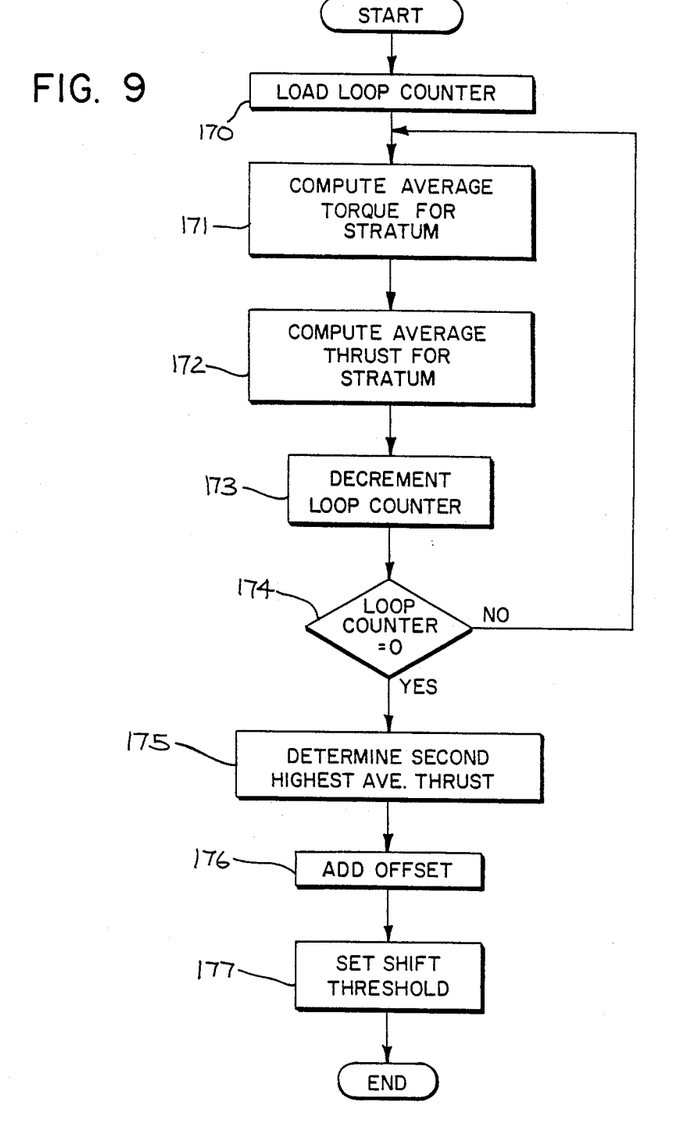
FIG. 9 is a flow chart of a routine for adjusting the drill speed shift thrust threshold.

When the operation stop flag is found to be set, indicating the completion of the drilling of the hole, the controller 26 begins executing a routine in which the average thrust for each of the speed strata of the workpiece is determined and the shift threshold is recalibrated to compensate for drill bit wear. This recalibration routine, depicted in the flow chart of FIG. 9, initially, loads a program loop counter at step 170 with the contents of the stratum counter. The average torque for the last speed stratum of the workpiece is then computed at step 171 by dividing the contents of the RAM 66 which represents the summation of the torque samples for that stratum with the number of samples that were taken. A similar average thrust is computed at step 172. The microprocessor 64 then decrements the loop counter at step 173 and a determination is made at step 174 whether the counter has reached zero. If the count is not zero, steps 171–173 are repeated for the samples from the next stratum of the workpiece.

After the average thrust and torque have been computed for each stratum of the workpiece, the program advances to step 175 where the computed average thrust values are compared to determine the second highest one. A fixed offset in then added to the second highest average thrust to recalibrate the shift threshold at step 176 as graphically illustrated at point Q on the thrust curve of FIG. 6. This dynamic adjustment of the shift threshold after drilling each hole, compensates for the affect that bit wear has on the thrust required to drill through the different layers. The resultant value is then stored in RAM 66 in the shift threshold storage location at step 177 before the recalibration routine ends.

For each hole that is drilled, the sets of thrust and torque samples stored in the data tables 86 and 87 of RAM 66 can be archived on a tape or disk or uploaded to a host computer (not shown).

Although the present dynamic speed control invention has been described in terms of a positive feed drill, it can be utilized on other types of machines for forming a workpiece with a tool or bit.

We claim:

1. A mechanism for forming a workpiece with a tool comprising:
   a means for rotationally driving the tool at one of two speeds;
   a means for sensing a force applied to the tool;
   a first means for comparing the sensed force to a first threshold value;
   means for shifting the speed of said means for driving in response to the first means for comparing; and
   means, responsive to the sensed force, for periodically redefining the first threshold value.

2. The mechanism as recited in claim 1 further comprising a second means for comparing the sensed force to a second threshold value to determine when the tool engages the workpiece.

3. The mechanism as recited in claim 2 further comprising a third means for comparing the sensed force to a third threshold to determine when the tool has penetrated through the workpiece.

4. The mechanism as recited in claim 3 wherein said means for shifting the speed is further responsive to the second and third means for comparing.

5. The mechanism as recited in claim 1 further comprising:
   fourth means for comparing the sensed force to a fourth threshold value to determine tool wear.

6. The mechanism as recited in claim 1 further comprising means for retracting the tool from the workpiece in response to the fourth means for comparing.

7. A method for controlling the speed of a tool driven by a machine having a first speed that is faster than a second speed, said method comprising:
   sensing a force exerted on the tool;
   comparing the sensed force to a first threshold value;
   shifting the speed of the machine to the second speed in response to the sensed force exceeding the first threshold value, and to the first speed in response to the sensed force being below the first threshold value;
   determining the average force exerted on the tool during a given period of time after a shift in speed; and
   employing the determined average force to redefine the first threshold value.

8. The method as recited in claim 7 wherein the given period begins a first interval of time after a shift occurs.

9. The method as recited in claim 7 further comprising:
   initially comparing the sensed force to a second threshold value to determine when the tool contacts a workpiece;
   shifting the machine to the second speed upon a determination that the tool has contacted the workpiece; and
   inhibiting a subsequent shift in speed for a given interval thereafter.

10. The method as recited in claim 7 wherein said shifting the speed of the machine to the first speed occurs only if the force remains below the first threshold value at the end of a second interval of time.

11. The method as recited in claim 7 further comprising:
    comparing the sensed force to a third threshold value to determine when the tool has penetrated through a workpiece; and
    shifting the speed of the machine to the second speed upon a determination that the tool has penetrated through the workpiece.

12. The method as recited in claim 7 wherein an average force is determined after each of a plurality of shifts in speed, and wherein said step of employing the average force to redefine the first threshold value comprises:
    selecting one of the average forces which has a predetermined relationship to the average force of the greatest magnitude; and
    setting the first threshold value to the sum of the selected average force and an offset value.

13. A drill for rotationally driving a bit into a workpiece to form a hole comprising:
    a prime mover;
    a transmission, coupled to said prime mover, for selectively driving the bit at either a first or a second speed;
    means for sensing a force applied to the bit;

means for comparing the sensed force to a plurality of threshold values;

means, responsive to the means for comparing, for shifting the speed of the transmission (1) to the first speed for a first interval upon the sensed force exceeding a first threshold value, (2) thereafter shifting the speed of the transmission to the first speed in response to the sensed force being above a second threshold value and to the second speed in response to the sensed force being below the second threshold value, and (3) shifting the speed of the transmission to the first speed whenever the sensed force is below a third threshold value;

means for determining the value of the average force exerted on the bit during a second interval of time after each shift in speed in response to the force crossing the second threshold value; and means, responsive to the average force values, for redefining the second threshold value.

14. The drill as recited in claim 13 wherein the means for redefining the second threshold value includes means:

for selecting the average force value which has a predetermined relationship to the average force value of the greatest magnitude; and means for setting the second threshold value to the sum of the selected average force value and a offset value.

15. The drill as recited in claim 13 further comprising means for storing samples of the sensed force.

16. The drill as recited in claim 13 wherein the means for shifting the speed of the transmission further includes means for delaying the shifting to the second speed for a third interval of time after the sensed force drops below the second threshold value.

17. The drill as recited in claim 13 wherein the means for determining the values of the average force commences the second interval of time upon the expiration of a fourth interval of time after a shift in speed.

18. The drill as recited in claim 13 further comprising means for disabling advancement of the drill into the workpiece upon the sensed force exceeding a fourth threshold value.

19. A drill having a bit for forming a hole in a workpiece comprising:

a means for selectively rotationally driving the bit at either a first or a second speed;

means for sensing a force applied to the bit;

means for comparing the sensed force to a threshold value;

means, responsive to the means for comparing, for shifting the speed of said means for driving (1) to the first speed in response to the sensed force being above the threshold value, and (2) to the second speed in response to the force being below the threshold value for a first predetermined period of time.

20. The drill as recited in claim 19 further comprising:

means for determining the value of the average force exerted on the bit during a second predetermined period of time after a shift in speed; and means, responsive to the average force values, for redefining the threshold value.

* * * * *